United States Patent
Yang et al.

(10) Patent No.: US 11,724,194 B2
(45) Date of Patent: Aug. 15, 2023

(54) INITIAL RESULTS OF A REINFORCEMENT LEARNING MODEL USING A HEURISTIC

(71) Applicant: Blizzard Entertainment, Inc., Irvine, CA (US)

(72) Inventors: Wayne Yang, Lake Forest, CA (US); David Pendergrast, Irvine, CA (US); Alexander Zook, Irvine, CA (US)

(73) Assignee: BLIZZARD ENTERTAINMENT, INC., Irvine, CA (US)

( * ) Notice: Subject to any disclaimer, the term of this patent is extended or adjusted under 35 U.S.C. 154(b) by 188 days.

(21) Appl. No.: 17/387,321

(22) Filed: Jul. 28, 2021

(65) Prior Publication Data
US 2023/0034222 A1 Feb. 2, 2023

(51) Int. Cl.
*A63F 13/57* (2014.01)
*A63F 13/67* (2014.01)
*G06N 3/08* (2023.01)
*G06F 18/10* (2023.01)
*G06N 5/01* (2023.01)

(52) U.S. Cl.
CPC .............. *A63F 13/67* (2014.09); *A63F 13/57* (2014.09); *G06F 18/10* (2023.01); *G06N 3/08* (2013.01); *G06N 5/01* (2023.01); *A63F 2300/6027* (2013.01)

(58) Field of Classification Search
CPC .. A63F 13/67; A63F 13/57; A63F 2300/6027; G06F 18/10; G06N 5/01; G06N 3/08
See application file for complete search history.

(56) References Cited

U.S. PATENT DOCUMENTS

| | | | | |
|---|---|---|---|---|
| 7,296,007 B1* | 11/2007 | Funge | ................... | G06N 20/00 434/350 |
| 7,636,701 B2* | 12/2009 | Funge | ................... | A63F 13/67 706/45 |
| 11,484,788 B2* | 11/2022 | Lee | ........................ | G06N 3/08 |
| 11,534,690 B2* | 12/2022 | Wu | ........................ | G06N 20/00 |
| 2002/0054016 A1* | 5/2002 | Smith | .................... | A63F 13/35 345/156 |
| 2002/0054626 A1* | 5/2002 | Inamura | ................. | A63F 13/31 375/219 |
| 2004/0110563 A1* | 6/2004 | Tanaka | .................. | A63F 13/30 463/42 |

(Continued)

*Primary Examiner* — David L Lewis
*Assistant Examiner* — Matthew D Hoel
(74) *Attorney, Agent, or Firm* — Hickman Becker Bingham Ledesma LLP

(57) ABSTRACT

Systems and methods for improving initial results of a reinforcement learning model are described herein. In an embodiment, a server computer initiates a reinforcement learning model for a modeled system. While executing the reinforcement learning model, the server computer computes a first result value for a particular action using the reinforcement learning model and a second result value for the particular action using a heuristic separate from the reinforcement model. Based, at least in part, on the first result value for the particular action and the second result value for the particular action, the server computer performs the particular action. The server computer determining a result from performing the particular action and updates the reinforcement learning model.

16 Claims, 5 Drawing Sheets

(56) References Cited

U.S. PATENT DOCUMENTS

| | | | | |
|---|---|---|---|---|
| 2006/0256819 A1* | 11/2006 | Lum | | H04W 80/00 |
| | | | | 370/310 |
| 2007/0260567 A1* | 11/2007 | Funge | | A63F 13/67 |
| | | | | 706/47 |
| 2008/0182663 A1* | 7/2008 | Cheung | | A63F 13/358 |
| | | | | 463/41 |
| 2009/0264172 A1* | 10/2009 | Morimura | | A63F 13/44 |
| | | | | 463/7 |
| 2009/0305788 A1* | 12/2009 | Bronstein | | A63F 13/10 |
| | | | | 463/43 |
| 2010/0029382 A1* | 2/2010 | Cao | | A63F 13/67 |
| | | | | 463/31 |
| 2010/0114892 A1* | 5/2010 | Kaneko | | G06Q 30/02 |
| | | | | 707/E17.089 |
| 2011/0244946 A1* | 10/2011 | Porwal | | A63F 13/655 |
| | | | | 707/706 |
| 2015/0196841 A1* | 7/2015 | Lee | | H04L 43/04 |
| | | | | 463/42 |
| 2015/0238862 A1* | 8/2015 | Suzuki | | A63F 13/58 |
| | | | | 463/31 |
| 2015/0352451 A1* | 12/2015 | Brenden | | H04L 51/52 |
| | | | | 463/31 |
| 2016/0012741 A1* | 1/2016 | Lee | | G06Q 50/20 |
| | | | | 434/322 |
| 2016/0155355 A1* | 6/2016 | Merzenich | | A63F 13/80 |
| | | | | 434/236 |
| 2017/0339089 A1* | 11/2017 | Longdale | | G06F 40/134 |
| 2018/0011682 A1* | 1/2018 | Milevski | | A63F 13/47 |
| 2018/0093191 A1* | 4/2018 | Lee | | A63F 13/69 |
| 2018/0124148 A1* | 5/2018 | Boudville | | A63F 13/213 |
| 2018/0225873 A1* | 8/2018 | Murdock | | A63F 13/67 |
| 2018/0290060 A1* | 10/2018 | Noss | | A63F 13/47 |
| 2019/0001226 A1* | 1/2019 | Komaba | | A63F 13/822 |
| 2019/0030436 A1* | 1/2019 | Miyamoto | | A63F 13/67 |
| 2019/0143217 A1* | 5/2019 | Yoneyama | | A63F 13/52 |
| | | | | 463/42 |
| 2019/0303769 A1* | 10/2019 | Xie | | A63F 13/56 |
| 2019/0388787 A1* | 12/2019 | Padmanabhan | | G09B 19/00 |
| 2020/0086217 A1* | 3/2020 | Trombetta | | A63F 13/493 |
| 2020/0122039 A1* | 4/2020 | Meuleau | | A63F 13/63 |
| 2020/0289939 A1* | 9/2020 | Hagland | | G06F 21/6254 |
| 2020/0298128 A1* | 9/2020 | Yannakakis | | G06N 20/10 |
| 2021/0016185 A1* | 1/2021 | Linguanti | | A63G 31/00 |
| 2021/0069592 A1* | 3/2021 | Noss | | A63F 13/67 |
| 2021/0077906 A1* | 3/2021 | Akaza | | A63F 13/67 |
| 2021/0097449 A1* | 4/2021 | Chattopadhyay | | G06N 20/20 |
| 2021/0165481 A1* | 6/2021 | Brugarolas Brufau | | |
| | | | | G06T 15/00 |
| 2021/0197087 A1* | 7/2021 | Lee | | A63F 13/47 |
| 2021/0245044 A1* | 8/2021 | French | | A63F 13/47 |
| 2021/0255471 A1* | 8/2021 | Trisnadi | | H04N 9/3155 |
| 2021/0264319 A1* | 8/2021 | Cao | | G06N 20/20 |
| 2021/0275911 A1* | 9/2021 | Padmanabhan | | G06F 16/35 |
| 2021/0291051 A1* | 9/2021 | Edridge | | A63F 13/44 |
| 2021/0362054 A1* | 11/2021 | Blok | | A63F 13/47 |
| 2022/0036201 A1* | 2/2022 | Tamir | | G06F 18/10 |
| 2022/0054943 A1* | 2/2022 | Wu | | G06N 3/08 |
| 2022/0168636 A1* | 6/2022 | Weising | | A63F 13/46 |

* cited by examiner

INITIAL RESULTS OF A REINFORCEMENT LEARNING MODEL USING A HEURISTIC

FIELD OF THE INVENTION

The present disclosure relates to reinforcement learning models. Specifically, the present disclosure relates to improving early results of reinforcement learning models for faster deployment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Reinforcement learning is a branch of machine learning techniques which is utilized for determining correct actions to take in different situations. Where supervised learning models are trained using labeled training datasets and unsupervised learning models are trained using unlabeled training datasets, reinforcement learning models are trained by selecting actions to perform, causing or simulating performance of the action, and determining whether the result of the action was positive or negative.

One such reinforcement model, AlphaZero, was developed and trained to compete in strategy games such as Chess and Go. AlphaZero determines which moves to make in these games using a combination of a neural network and a Monte Carlo tree search (MCTS). AlphaZero computes probabilities of success of performing different moves based on a state of the game. Moves with high probabilities of success are expanded through a tree search to identify possible future game states. A move is then selected based on the search and the move is performed. When the game is completed, the outcome of the game is used to adjust probabilities of success for each combination of move and game state.

AlphaZero is useful for modeling games such as chess or go where all information in the game is available to both players and the algorithm can be trained in advance using pre-build artificial intelligence programs. Because chess and go are static games with a consistent set of rules over time, the training time of the model becomes less and less relevant over time. Once the model has been trained, it can be used for any future chess or go games.

Costs of model training become far more relevant for games that dynamically change over time with respect to rules and moves. For instance, collectable card games (CCGs) such as Hearthstone are continuously updated with new rule sets, changes in existing rule sets, new cards, changes in existing cards, and new types of abilities or interactions. When the game is updated, the pre-trained reinforcement learning model stops being viable. While a new model could be trained, the training of the new model requires opponents and a new model will not immediately put out viable results, making the new model useless for the initial part of the training phase.

Thus, there is a need for a method for training a reinforcement learning model in a manner that improves initial results, thereby allowing for early deployment.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods for improving initial results of a reinforcement learning model are described herein. In an embodiment, a reinforcement learning model, such as the AlphaZero model, is initialized to model a system. During an initial policy selection phase, the reinforcement learning model generates a probability distribution over possible actions. During a search phase, different actions are evaluated using both a neural network and a computed heuristic value. The evaluations are combined and used to determine a value of performing different actions. Based on the values, different actions are selected for simulation. Based on a visit count of different actions during the search stage, an action is selected to perform. When a result is received for the modeled system, the neural network is updated.

The methods described herein improve on previous reinforcement learning models, like Alpha Zero by improving initial results, thereby allowing the models to be introduced in updating games where training of the model is performed in conjunction with the release and use of the model. By combining the heuristic value with the neural network computation, the system improves initial results such that initially chosen actions are more viable. This decreases the time required to train the model, as the heuristic biases the model against definite detrimental actions and increases the usability of the model at early stages instead of requiring a large amount of training before the model provides viable results.

In an embodiment, a method comprises initiating a reinforcement learning model for a modeled system; while executing the reinforcement learning model, computing a first result value for a particular action using the reinforcement learning model and a second result value for the particular action using a heuristic separate from the reinforcement model; based, at least in part, on the first result value for the particular action and the second result value for the particular action, performing the particular action; determining a result from performing the particular action and updating the reinforcement learning model.

Structural Overview

Figure 1:
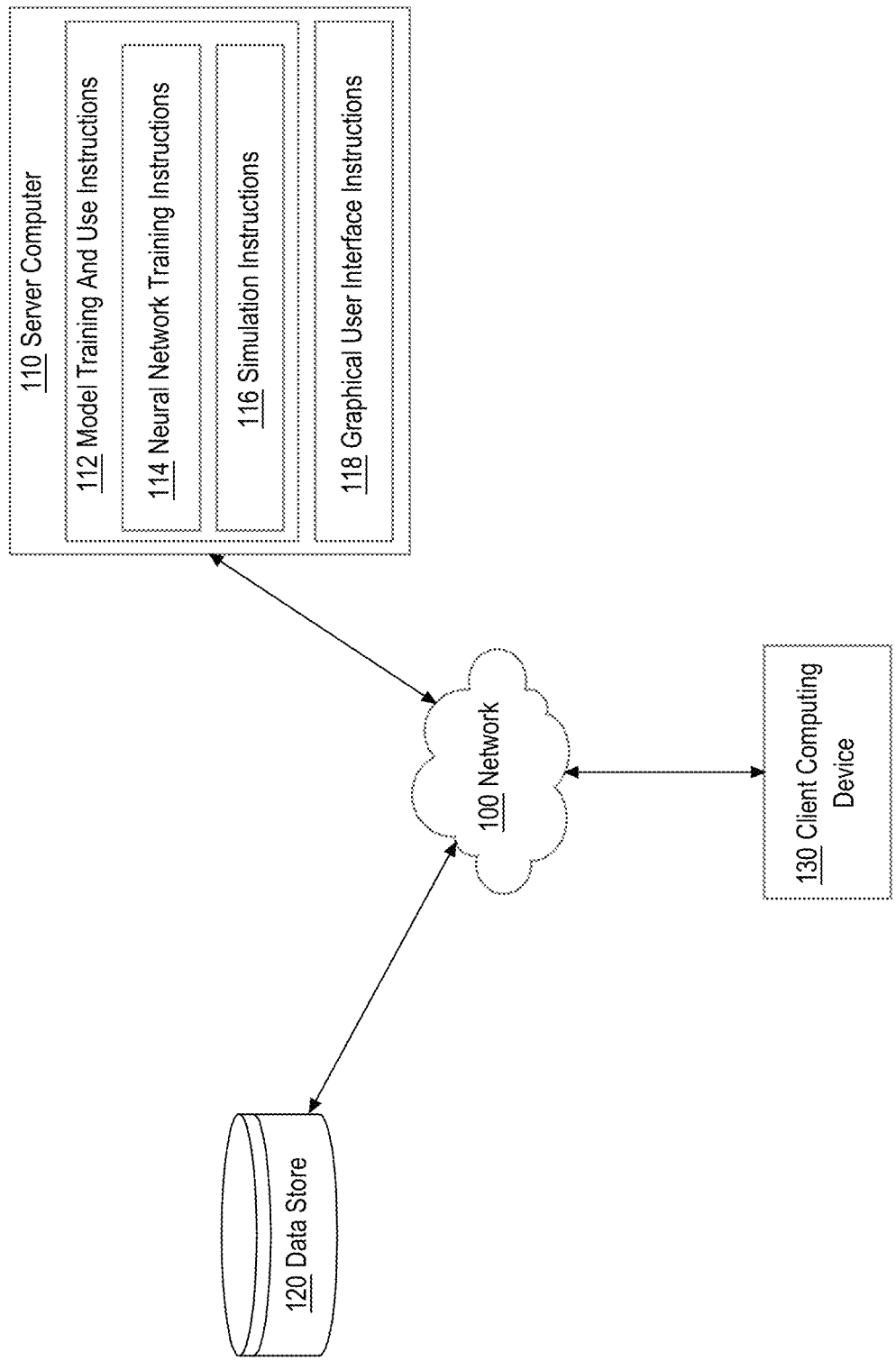
FIG. 1 depicts an example system for training and using a reinforcement learning model.

FIG. 1 depicts an example system for training and using a reinforcement learning model.

Server computer 110, data store 120, and client computing device 130 are communicatively coupled over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, data store 120, client computing device 130, and other elements of the system each comprise an interface compatible with the network 100 and are programmed or configured to use standardized protocols for communication across the networks such as TCP/IP, Bluetooth, CAN protocol and higher-layer protocols such as HTTP, TLS, and the like.

Server computer 110 may be implemented using a server-class computer or other computers having one or more processor cores, co-processors, or other computers. Server computer 110 may be a physical server computer and/or a virtual server instance stored in a data center, such as through cloud computing. Server computer 110 stores model training and use instructions 112 and graphical user interface instructions 118.

Model training and use instructions 112 comprise computer readable instructions which, when executed by one or more processors, cause the server computer to train and use a reinforcement learning model using the methods described herein. The model training and use instructions 112 may include instructions for training a neural network, instructions for computing probability distributions over actions, instructions for simulating performance of different actions during a search phase of the reinforcement learning model, instructions for computing a heuristic value, instructions for determining which actions can be performed, and/or any other instructions used to train and use a reinforcement learning model.

Graphical user interface instructions 118 comprise computer readable instructions which, when executed, cause the server computer to provide a graphical user interface to a client computing device 130. The graphical user interface may comprise a display of a system modeled by the reinforcement learning model. For example, a digital CCG may be depicted through the graphical user interface with options for a player to select and execute a plurality of actions. The graphical user interface may additionally include displayed results of executing the reinforcement learning model. For example, the reinforcement learning model may be used to determine actions for an artificial intelligence (AI) player to perform during a digital CCG. While the graphical user interface instructions 118 are depicted as being stored by server computer 110 which provides the graphical user interface to the client computing device 130, in other embodiments, the client computing device 130 stores the graphical user interface instructions and the server computer 110 sends instructions to the client computing device 130 to interact with the graphical user interface displayed on the client computing device 130.

Data store 100 comprises a storage medium configured to store data relating to a modeled system, such as a digital CCG. Data store 120 may comprise a database. As used herein, the term "database" may refer to either a body of data stored in a repository, the repository itself (e.g. a relational database management system (RDBMS)), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

The client computing device 130 is a computer that includes hardware capable of communicatively coupling the device to one or more server computer, such as server computer 110, over one or more service provides. For example, client computing device 130 may include a network card that communicates with server computer 110 through a home or office wireless router (not illustrated in FIG. 1) coupled to an internet service provider. The client computing device 130 may be a smart phone, personal computer, tabled computing device, PDA, laptop, or any other computing device capable of transmitting and receiving information and performing the functions described herein.

For purposes of illustrating a clear example, FIG. 1 shows a limited number of instances of certain functional elements. However, in other embodiments, there may be any number of such elements. For example, server computer 110 may receive requests from any number of client computing devices 130. Further, the server computer 110 may be implemented using two or more processor cores, clusters, or instances of physical machines or virtual machines, configured in a discreet location or co-located with other elements in a datacenter, share computing facility, or cloud computing facility. In other embodiments, one or more of the elements depicted herein may be combined. For example, a client computing device may store the trained machine learning systems. As another example, a same server computer may perform the training of the machine learning system and the computation of outputs using the trained machine learning system.

Model Overview

An example reinforcement learning model includes AlphaZero which includes a neural network for performing policy and value predictions, and a tree search algorithm which simulates possible outcomes of different policies. The reinforcement learning model may be defined by the following loss function used to train the model:

$$L = \Sigma_t (v_\theta(s_t) - z_t)^2 - \pi_t * \log(p_\theta(s_t))$$

where $v_\theta$ is the value prediction for the state of the game $s_t$ at time t, $z_t$ is the true value, $p_\theta$ is the probability distribution over possible actions for use in sampling based on the state of the game, and $\pi_t$ is the visit count distribution of the MCTS using $p_\theta(s_t)$ as a prior for selecting actions for expansion.

The state of the game and the probability distribution over possible actions may be computed based on information that would be available to a player of the game. Thus, hidden information, such as details of cards held by an opposing player or secret abilities played by an opposing player may not be included in the computation of the state of the game. The state of the game may include a turn number, an available amount of resource to play a card, an amount of health of the players, health and damage capabilities of minions on the board, and information relating to available cards to play.

During a first phase of evaluation, the system generates a probability distribution over possible actions to perform. The probability distribution over possible actions includes a value associated with the actions and states that are learned through the neural network. The value may indicate a probability of winning if the action is performed from a current game state. The neural network may learn the values using end results of each prior simulation. For example, data defining each state and action performed during the simulation may be stored. When the simulation ends, the system may determine whether the result was positive or negative. The probabilities for each state and action combination may be adjusted based on whether the result of the simulation was positive or negative.

During a second phase of evaluation, the system performs a search by simulating effects of different actions sampled from the probability distribution over actions. When selecting actions to search through, the system may select actions based on the probability distribution over actions and a number of times the action has been previously selected. The search through actions includes selecting an action, simulating a response to that action, then simulating future actions and responses to a given depth. After performing a set number of searches, the system selects an action to performed based on a visit count for that action. An example search mechanism is the Monte Carlo tree search (MCTS) which is used as part of the AlphaZero algorithm.

CCG Application

In an embodiment, the reinforcement learning system is configured to be applied to games with different types of options, games with changing mechanics or rules, and/or games with hidden information.

AlphaZero is configured to select actions to perform based on capabilities of individual pieces. Similarly, with a digital CCG, the system may identify actions to perform based on capabilities of the player. Thus, the initial actions may include all actions that can be performed, regardless of whether those actions would be beneficial or harmful, as long as the rules of the game allow them. The actions may be identified as containing two features: a source and a target. Each source may be identified as a vector which uniquely identifies the source, such as a card's ability, a played creature, a special ability, or a player. For general actions that do not have a specific target, a default target may be specified.

In the application of AlphaZero to a CCG, the system is configured to simulate the action of "passing" or finishing a turn as one of the possible actions. While in chess, each player can only play one piece per turn, in a CCG, a player may be able to play multiple cards or perform multiple actions in a turn, with options being limited by resources or character abilities. Thus, the search step may include performing multiple actions on the AI player turn until a "passing" option is selected. "Passing" is thus selected primarily when other actions do not increase chances of success over "passing".

Figure 3:
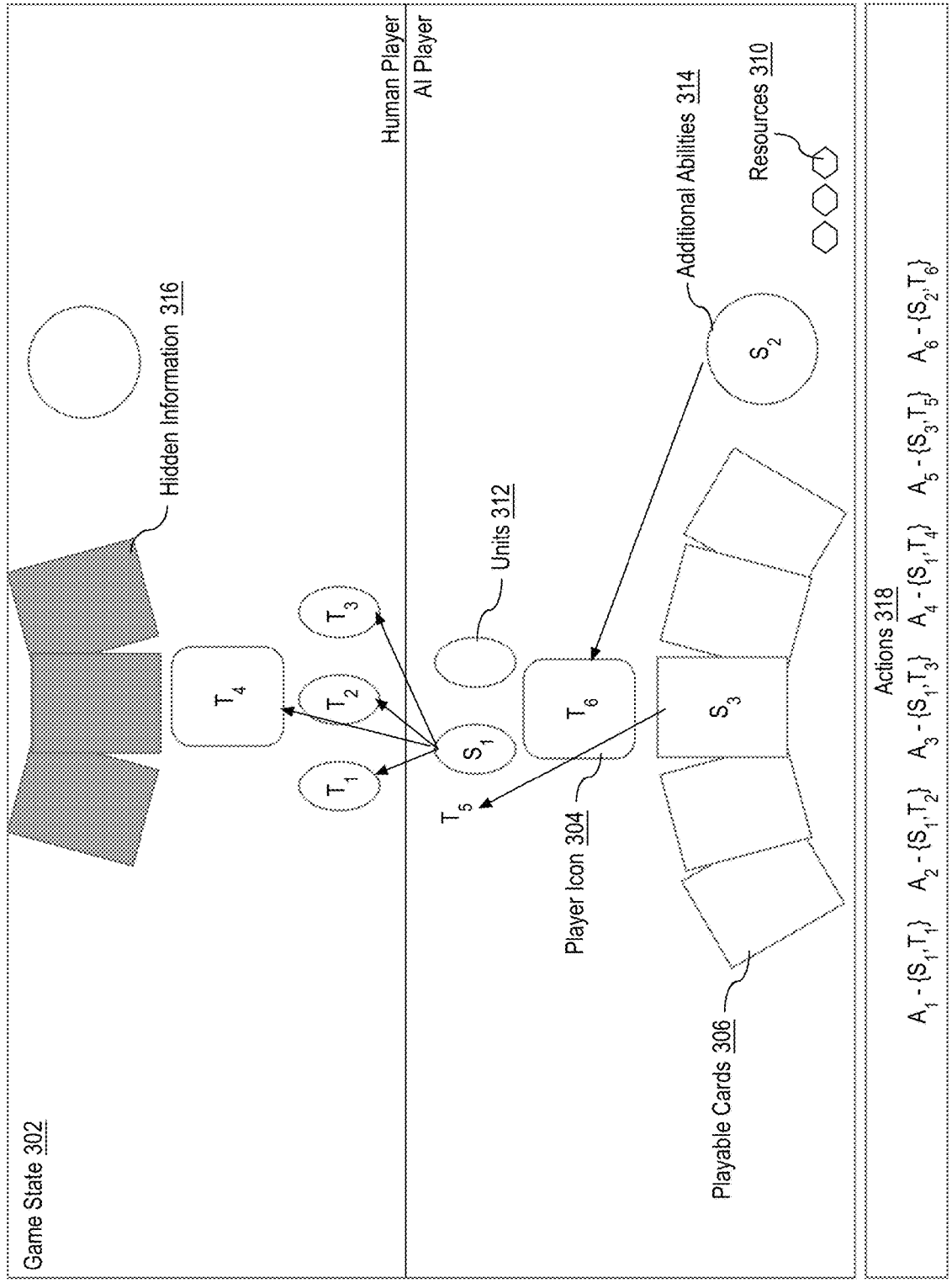
FIG. 3 depicts an example method of generating inputs for a reinforcement learning model from a digital CCG.

FIG. 3 depicts an example method of generating inputs for a reinforcement learning model from a digital CCG. FIG. 3 depicts a CCG at a particular game state 302. The game state, as used herein, refers to aspects of the game at a particular time. The game state 302 can change during a turn, such as after a new card has been played, and/or can change when a turn has changed. Game state 302 in FIG. 3 includes elements specific to a particular card game, but other digital turn based games may include more, less, and/or different elements.

Game state 302 comprises player icons 304, playable cards 306, resources 310, units 312, and additional abilities 314. The player icon 304 may include addition information, such as a health or armor of the player. The playable cards 306, units 312, and additional abilities 314 may be identified using unique vectors for the reinforcement learning model. The vectors may comprise identifying information without details of the cards, units, and abilities or their effects for the game state 302. Thus, inputs into the neural network include unique identifiers for each individual unit, ability, or card without including effects of the card, such as damage, cost, or health. The additional information may be used during the simulations of the tree search, but not as inputs to the neural network.

Hidden information 316 comprises information that would be hidden to a player during play of the game. In FIG. 3, hidden information 316 comprises cards held by another player. In other embodiments, hidden information can include secret abilities that were cast by another player, unit locations, or any information that may be known by one player but not another player. The game state 302 used to train the neural network may not include the hidden information 316.

Actions 318 comprise a set of actions that can be performed by the AI player. The actions shown in FIG. 3 may include actions that are capable of being performed, actions with learned probabilities over a threshold value, and/or a subset of actions that can be performed. For example, the additional ability may be an ability that can only be cast on the player icon, such as healing the player for two life. As another example, while the AI player has five cards in hand, the cards may have requirements that keep them from being playable, such as resource requirements or target requirements.

Each action has a source indicator and a target indicator. Actions $A_1$-$A_3$ each include the unit $S_1$ as the source and different units of the human player as the targets. Action $A_4$ includes unit $S_1$ as the source and the player icon for the human player as the target. Action $A_5$ is the playing of a card $S_3$ on the AI player's board $T_5$. Action $A_6$ is the use of an additional ability $S_2$ on the AI player's icon $T_6$. The system uses the current game state to compute a probability distribution over possible actions, with weights being learned using the methods described herein. Thus, each of actions $A_1$-$A_6$ may be associated with different probabilities.

Figure 4:
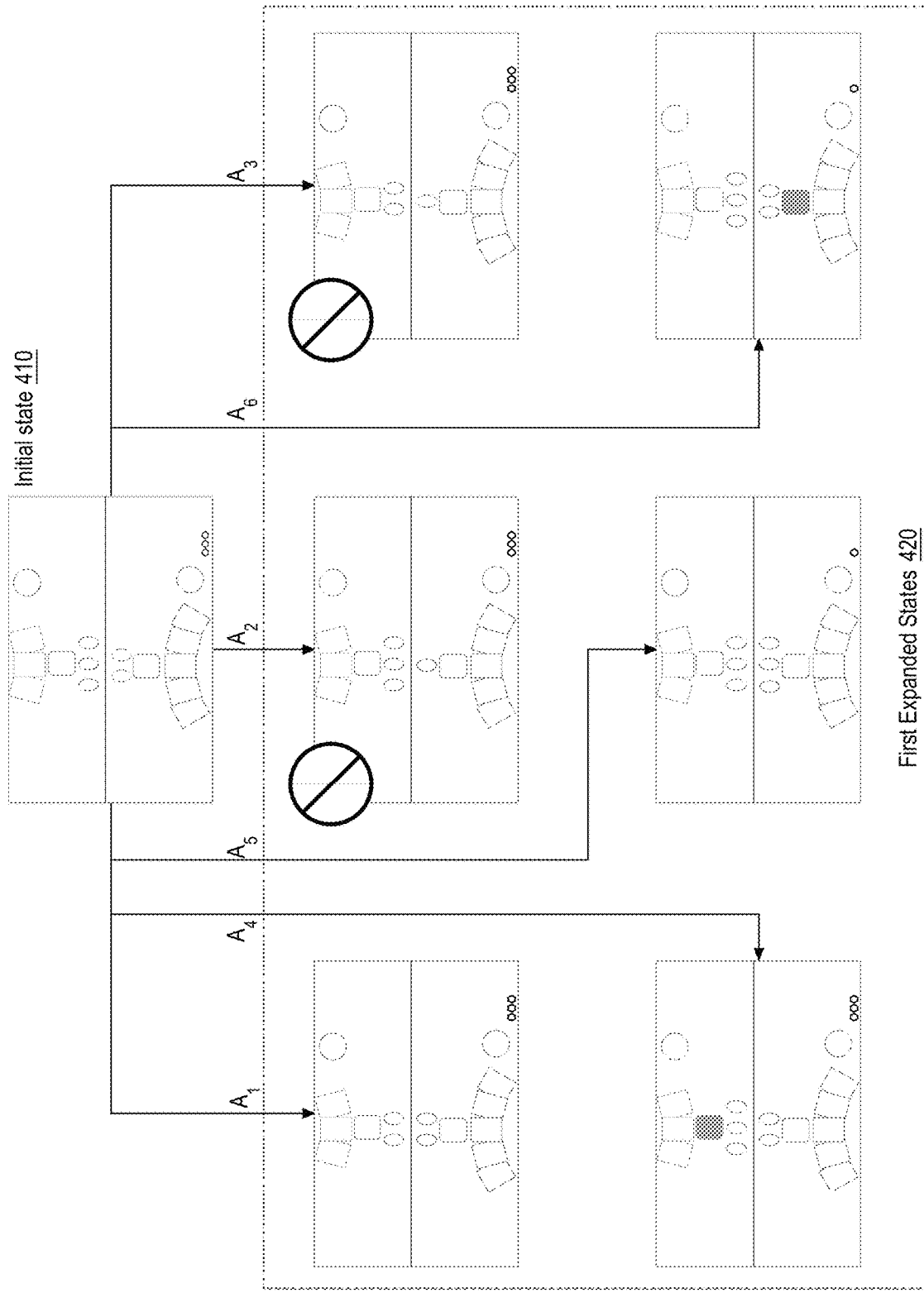
FIG. 4 depicts an example search phase of a reinforcement learning model for a digital CCG.

FIG. 4 depicts an example search phase of a reinforcement learning model for a digital CCG. Initial state 410 comprises a game state prior to the performance of any actions. For example, initial state 410 of FIG. 4 matches game state 302 of FIG. 3. The six actions of actions 318 of FIG. 3 are simulated in FIG. 4 to create first expanded states 420. Each of first expanded states 420 is a result of performing one of actions $A_1$-$A_6$. For example, the first displayed expanded state is a result of minion $S_1$ attacking minion $T_1$, leading to the removal of minion $T_1$.

In an embodiment, states that are determined to have a reduced likelihood of success are removed from the tree search. For instance, the expanded states generated from actions $A_2$ and $A_3$ may be removed if the likelihood of success of the game state is substantially lower than the likelihood of success at the initial state. For example, if the difference between the likelihood of success at the expanded state and the likelihood of success at the initial state is greater than a threshold value, the system may remove the expanded state from the search. Additionally or alternatively, the states may be kept, but be highly unlikely to be revisited due to their lower probability of success.

The system may perform a depth-limited expansion where the depth is determined by a number of actions and/or a number of turns. For example, the system may continue simulating game states after simulating action $A_1$ until a threshold number of game states, such as ten, have been sampled. The system may then select a next game state to sample based on the probability distribution over actions and the number of times each state has been searched. The system may be configured to reduce the likelihood of selecting an action as a number of searches of that action increases, thereby providing greater breadth to the search.

As noted above, the hidden information of FIG. 3 may be unavailable in determining the game state, but may be used during search phase when the search extends past the current player's turn. For example, when simulating actions and their results, during the opposing player's turn, the system may use hidden information, such as the cards the opposing player is holding, to simulate possible actions the opposing player may take. Thus, while the initial probability distribution over actions does not take into account information that would not be available to another player, the search phase, which helps update the model, may utilize the information to simulate possible actions the player may perform.

Heuristic Integration

Figure 2:
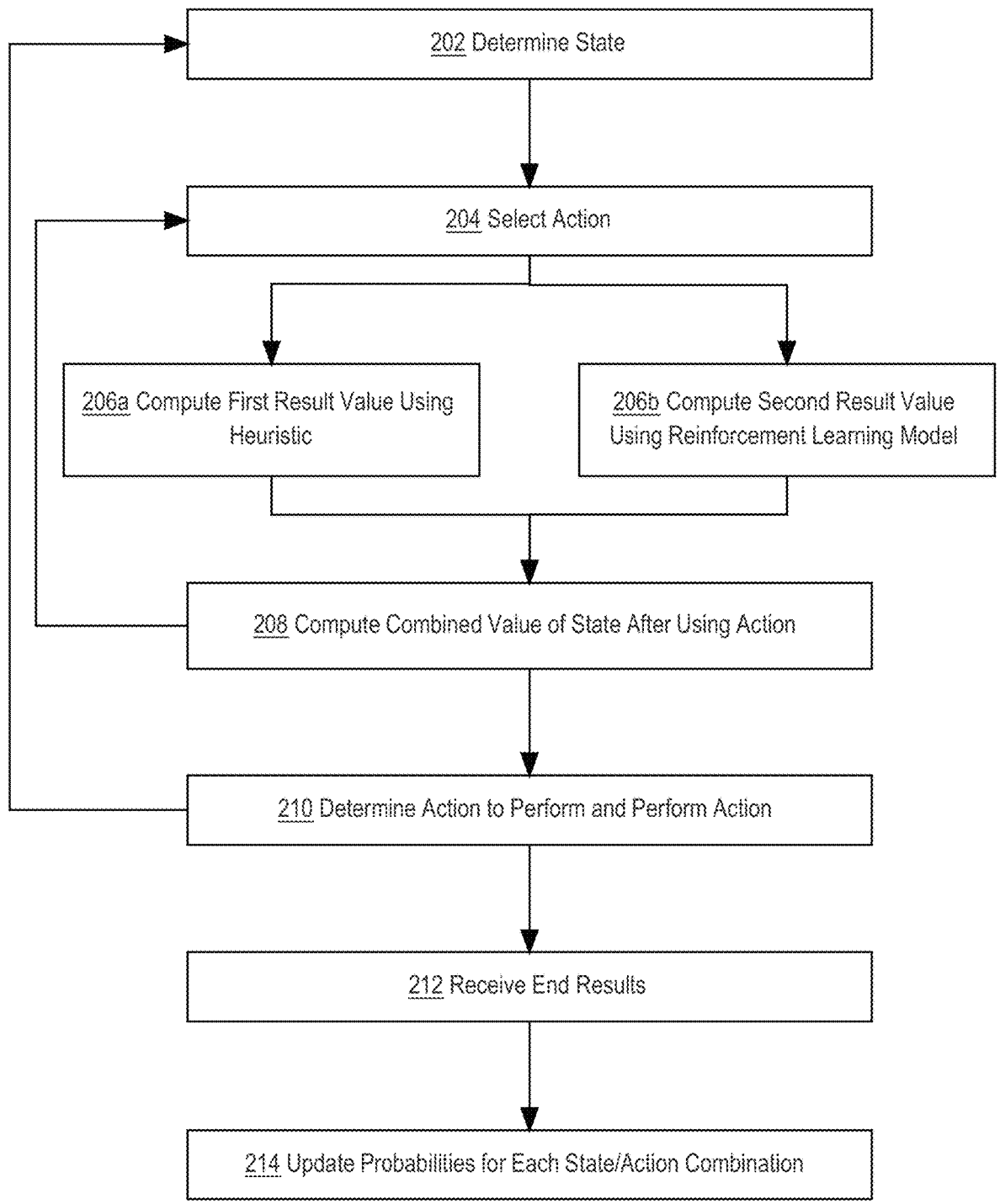
FIG. 2 depicts an example method of integrating a heuristic into a reinforcement model.

In an embodiment, a reinforcement learning model is adapted to provide earlier quality results with less training data. FIG. 2 depicts an example method of integrating a heuristic into a reinforcement model. The integration of the heuristic allows the model to be used earlier with less training, thereby reducing the cost of training the model and allowing the reinforcement model to be deployed at an untrained state. The method of FIG. 2 may be executed using a modification of existing reinforcement learning models, such as AlphaZero.

At step 202, a state is determined. The state may comprise a set of feature planes indicating different features of the game, including a representation of each unique feature. Thus, one plane may include vectors for each card that can be held. One plane may include vectors for each minion on the board. Another plane may include additional information for the minions on the board, such as buffs, debuffs, damage taken, or other effects on the minions. Another plane may include current resources. Another plane may include additional abilities, such as character abilities.

The state may comprise a state of a game after a particular policy has been implemented. For example, steps 204-208 may be performed during the search stage of the reinforcement learning instead of or in addition to the initial action selection. The steps of 204-208 may be performed for additional stages of searching as well. For example, at a plurality of game states during a depth search, the system may determine values of performing different actions using steps 204-208.

At step 204, an action is selected. The action may be selected from any action a player would be able to perform, including playing cards, attacking with minions, playing abilities, passing, or any other action that can be performed in the CCG. Actions may be limited by the rules of the CCG, thus removing cards that cannot be played or minions that cannot act from the possible actions. Steps 204-208 may be performed for each possible action. Thus, after step 208, the system may repeat the method of steps 204-208 with a next action. Additionally or alternatively, one or more possible actions may be manually configured to not be selected in this step, thereby further increasing the initial value of the selected actions. While the term "action" is used, the "action" may refer to both a source and destination. Thus, a particular minion attacking may be multiple actions, a first action for the minion attacking a first opposing minion and a second action for the minion attacking a second opposing minion. The action may be identified using two unique vectors, one unique vector corresponding to the source of the action and a second unique vector corresponding to the target of the action.

At step 206a, a first result value is computed using a heuristic. For example, the system may compute a heuristic value for a board state after performance of the action. The heuristic may be a computation that is dependent on available information separate from the information used for training the reinforcement learning system. For example, the reinforcement learning system may identify each card or unit as a unique vector which does not incorporate card or unit information. In contrast, the heuristic may be computed using values such as health of current units, health of each players, damage of individual units, or other details. As an example, a heuristic value may be computed as:

$$H=f(HP_P)+f(HP_U)+f(D_U)+f(R)$$

where $HP_P$ is a difference in health between players, $HP_U$ is a difference in total health between units of the players, $D_U$ is a difference in damage between units of the players, and R is available resources of the player. The functions may comprise a weight multiplied by the values. For example, player health may be weight higher than unit health. Any basic heuristic may be used which distinguishes in value between different game states.

In an embodiment, a heuristic is calculated as a difference between board state scores for each player's board state which is then normalized through a sigmoid function to be within the range of [−1,1] to match the output of the neural network. Thus, the heuristic may be computed as:

$$S_{raw} = (S_{friendly}) - (S_{opponent})$$

$$S_{norm} = \frac{2}{1 + e^{-kS_{raw}}} - 1$$

where $S_{raw}$ is a raw score, $S_{normal}$ is the normalized score used as the heuristic, $S_{friendly}$ is the score for the player's board, $S_{opponent}$ is the score for the opponent's board, and k is a parameter that may be configured based on the expected raw score states, such as 2.

The scores computed for each player's board state may comprise a summation of values corresponding to a particular game. For example, in a card game comprising resources, player health, minions, special effects, and other types of cards that may be in play, a value may be prescribed to each factor. For example, each resource may be worth 4 points, health points may be each worth 2 points or worth a different number of points depending on a health range, such as 4 points for each health point within the first 12 health points and 2 points for each health point within the next 12 health points, cards in hand may be worth additional points with modifiers to the cards increasing the point value and penalties decreasing the point value, minions in play may be valued as a function of their attack multiplied by their health with other modifiers increasing or decreasing their value as defined, and special effects or additional effects cards may have preset values.

As different games may use different implementations, the board state value's computation may be extremely game specific, with values for cards in hand or minions on the board varying between types of games and rules. Thus, the heuristic's implementation may be performed by pre-selecting values for each type of aspect of the game, such as minion value or health value, and summing those values for each player. One practical example of a board game computation comprises:

$$S_{friendly} = F(HP_{player}) + \sum_{minions}(D_{minion} \times HP_{minion} + Mod_{minion}) + F(C) + F(R)$$

where $F(HP_{player})$ is a function of the player's hit points, which may include merely a total number of hit points of the player, $D_{minion}$ is the damage of a minion in play, $HP_{minion}$ is the hit points of the minion in play, $Mod_{minion}$ is a value corresponding to a modifier of the minion which may be preset for each modifier type, $F(C)$ is a function of a number of cards in hand, such as a base value plus one for each additional card, and $F(R)$ is a function of a number of resources available, such as a multiple of the available resources.

At step 206b, a second result value is computed using a reinforcement learning model. For example, a probability of success for a particular action may be learned through training of the reinforcement learning system, with the probability of success being tied to a game state and an action comprising a source and a destination. At initialization of the reinforcement learning model, the probability of success of different actions is untrained, and thus may not accurately indicate values of performing different actions.

At step 208, a combined value of the state after performance of the action is computed. For example, the system may compute an average of the first value and the second value. Other examples may include different weights being assigned to the first value and the second value. The weights may be static and/or may change over time. For example, the weights may be dependent on a number of completed games with the first value being given less weight over time and the second value being given more weight over time. This may be done with weights that are dependent on a game, such as a weight for the first value being computed as $$w = .25 + \frac{.25}{1 + .005n}$$

where n is a number of games played. In other embodiments, a stepwise function may be used to determine weights, such as decreasing a weight of the heuristic at every thousand games up to a threshold point.

The combined value of the state after performance of the action is used in the search phase to determine whether to select the action as a next action to simulate in the depth limited search. The system may select actions to search based on a visit count and the combined state value similar to the methods used by AlphaZero with the combined state value replacing the move probability used by AlphaZero during the search. After a threshold number of searches are performed, the system selects moves to perform based on visit counts at the initial state.

By combining a value computed using the reinforcement learning model with an objective statistic, the system ensures that early iterations of the model produce results that are usable while still allowing the model to be trained through reinforcement learning techniques that can be applied to early games. While early results may not be as optimal as results generated when the model has been trained through thousands of games, the early results would still provide better moves than an untrained model, thereby allowing the model to be deployed in situations where separate pre-training of the model is unavailable or unfeasible.

At step 210, the system determines an action to perform and performs the action. For example, the system may select an action to perform based on a number of visit counts for each action at the root game state. As the visit counts are based on the combined value computed for each action, the selection of an action to perform is based, at least in part, on the combined values computed for the actions. After selecting an action, the system causes performance of the action, such as playing of a card or attacking with a minion. After the action is performed, the system may determine whether another action can be performed, such as when a player turn has not ended. If another action can be performed, the system may repeat the steps of 202-210 with the new game state. The system may further save data indicating the action performed and the game state at the time the action was performed.

At step 212, end results are received. The end results may indicate whether the AI player won the game or lost the game. Thus, end results may be received only after a game has finished, with the game including a plurality of actions performed using the methods described herein.

At step 214, probabilities for each state and action combination are updated. For example, when the game ends, the system may associate the end results with each game state and action combination. For example, the system may store a plurality of triples comprising [state, action, final_result]. The system may store the triples as independent datapoints which are then used during future games to determine the likelihood of success for combinations of game state and action. In other embodiments, the system may compute a probability value for each combination of game state and action performed. For example, the true value used in the loss function, $z_t$, for each combination of state and action may be computed as an average of the final results for that combination of state and action across different games where the action was performed at that state. Thus, if two games were won in which action $A_1$ was performed at state $S_1$ and one game was lost when action $A_1$ was performed at state $S_1$, the true for $[A_1, S_1]$ may be 0.67. Additionally, the probability that an action is selected may be updated based on whether the action was selected in previous games.

INVENTORS: THE NEXT SECTIONS CONTAIN
FORM LANGUAGE DEFINING MACHINE
LEARNING MODELS AND COMPUTING
SYSTEMS GENERALLY

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/or serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for ML model 1316 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. A supervised or unsupervised ANN model may be elevated as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
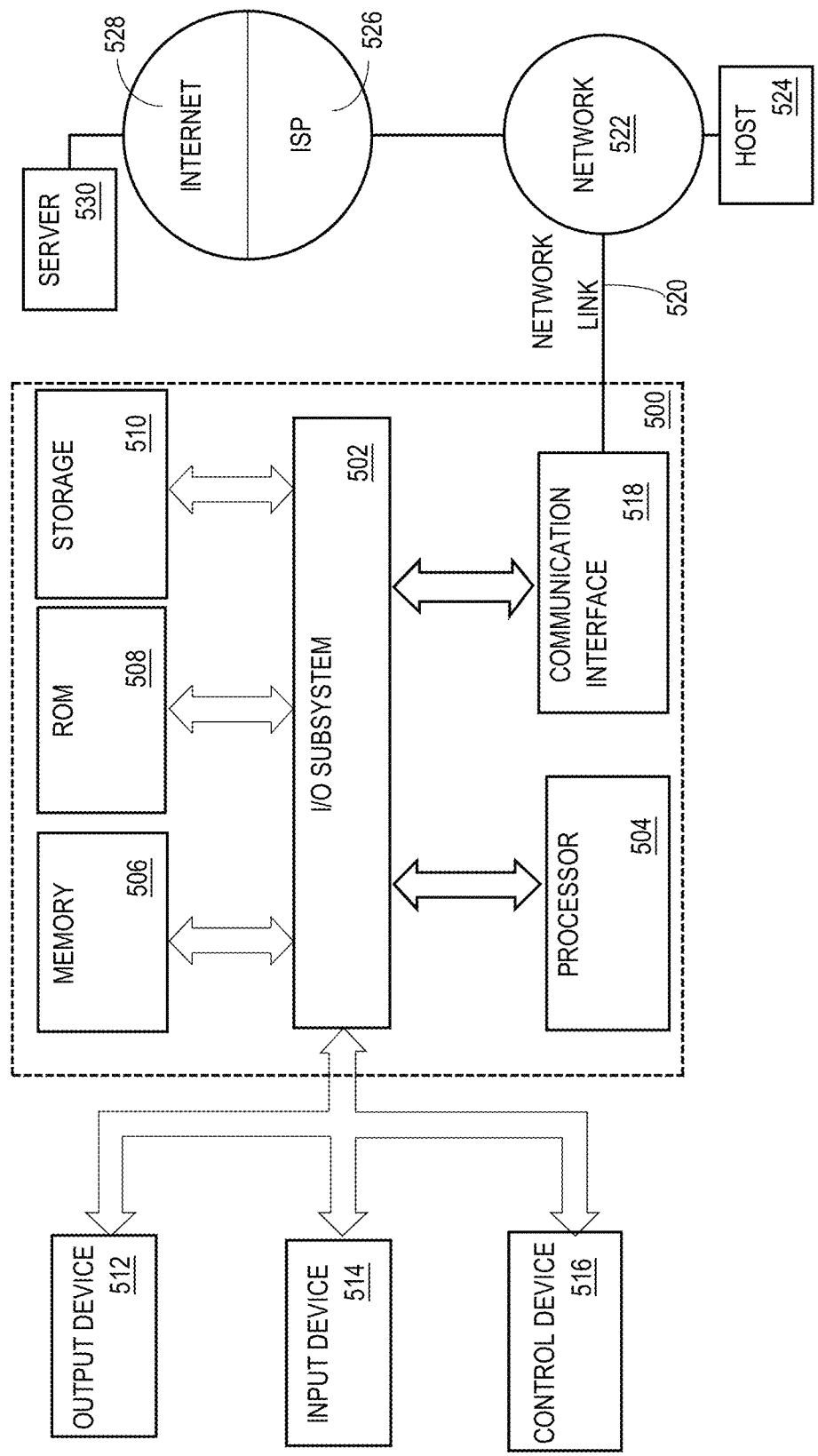
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
one or more processors;
a memory storing instructions which, when executed by the one or more processors, cause performance of:
initiating a reinforcement learning model for a modeled system;
while executing the reinforcement learning model, computing a first result value for a particular action using the reinforcement learning model and a second result value for the particular action using a heuristic separate from the reinforcement model;
based, at least in part, on the first result value for the particular action and the second result value for the particular action, performing the particular action;

determining a result from performing the particular action and updating the reinforcement learning model.

2. The system of claim 1, wherein the instructions, when executed by the one or more processors, further cause performance of:
computing an average of the first result value and the second result value;
determining whether to perform the particular action based on the average of the first result value and the second result value.

3. The system of claim 1, wherein the instructions, when executed by the one or more processors, further cause performance of:
simulating a result of performance of the particular action;
determining whether to simulate additional actions based, at least in part, on the first result value and the second result value;
prior to performing the particular action, determining whether to perform the particular action based, at least in part, on whether additional actions were simulated.

4. The system of claim 1, wherein the modeled system comprises a turn-based digital game where actions can be performed using different digital items.

5. The system of claim 4, wherein computing the second result value comprises computing a heuristic defining a value of a game state after the particular action has been performed.

6. The system of claim 4, wherein the particular action comprises an action source and an action target.

7. The system of claim 4, wherein:
the reinforcement learning model comprises a deep neural network and a tree search algorithm;
one or more actions performable by a non-computer are hidden from the reinforcement learning model when priors are generated to be used for the tree search algorithm;
the one or more actions performable by the non-computer are provided to the reinforcement learning model when the tree search algorithm is executed.

8. The system of claim 4, wherein:
the first result value comprises a probability of winning the turn-based digital game based on an identified game state;
determining the result from performing the particular action comprises determining if the game was won or lost;
updating the reinforcement learning model comprises adjusting the probability of winning the turn-based digital game for the identified game state and the particular action.

9. A method comprising:
initiating a reinforcement learning model for a modeled system;
while executing the reinforcement learning model, computing a first result value for a particular action using the reinforcement learning model and a second result value for the particular action using a heuristic separate from the reinforcement model;
based, at least in part, on the first result value for the particular action and the second result value for the particular action, performing the particular action;
determining a result from performing the particular action and updating the reinforcement learning model.

10. The method of claim 9, further comprising:
computing an average of the first result value and the second result value;
determining whether to perform the particular action based on the average of the first result value and the second result value.

11. The method of claim 9, further comprising:
simulating a result of performance of the particular action;
determining whether to simulate additional actions based, at least in part, on the first result value and the second result value;
prior to performing the particular action, determining whether to perform the particular action based, at least in part, on whether additional actions were simulated.

12. The method of claim 9, wherein the modeled system comprises a turn-based digital game where actions can be performed using different digital items.

13. The method of claim 12, wherein computing the second result value comprises computing a heuristic defining a value of a game state after the particular action has been performed.

14. The method of claim 12, wherein the particular action comprises an action source and an action target.

15. The method of claim 12, wherein:
the reinforcement learning model comprises a deep neural network and a tree search algorithm;
one or more actions performable by a non-computer are hidden from the reinforcement learning model when priors are generated to be used for the tree search algorithm;
the one or more actions performable by the non-computer are provided to the reinforcement learning model when the tree search algorithm is executed.

16. The method of claim 12, wherein:
the first result value comprises a probability of winning the turn-based digital game based on an identified game state;
determining the result from performing the particular action comprises determining if the game was won or lost;
updating the reinforcement learning model comprises adjusting the probability of winning the turn-based digital game for the identified game state and the particular action.

* * * * *